(12) United States Patent
Yamazaki et al.

(10) Patent No.: US 11,247,690 B2
(45) Date of Patent: Feb. 15, 2022

(54) DRIVING FORCE CONTROL APPARATUS, DRIVING APPARATUS, AND DRIVING FORCE TRANSMISSION APPARATUS

(71) Applicant: JTEKT Corporation, Osaka (JP)

(72) Inventors: Tetsuya Yamazaki, Tokai (JP); Tomoaki Kato, Kariya (JP); Wataru Hirata, Ichinomiya (JP); Toshihiko Yamamoto, Nishio (JP)

(73) Assignee: JTEKT Corporation, Osaka (JP)

( * ) Notice: Subject to any disclaimer, the term of this patent is extended or adjusted under 35 U.S.C. 154(b) by 204 days.

(21) Appl. No.: 16/669,571

(22) Filed: Oct. 31, 2019

(65) Prior Publication Data

US 2020/0139978 A1    May 7, 2020

(30) Foreign Application Priority Data

Nov. 7, 2018    (JP) .............................. JP2018-209816

(51) Int. Cl.
*B60W 40/107*    (2012.01)
*B60W 10/02*    (2006.01)

(52) U.S. Cl.
CPC .......... *B60W 40/107* (2013.01); *B60W 10/02* (2013.01); *B60W 2520/105* (2013.01); *B60W 2520/12* (2013.01); *B60W 2552/40* (2020.02); *B60W 2710/02* (2013.01)

(58) Field of Classification Search
CPC .......... G09G 5/005; G09G 5/10; G09G 5/377; G09G 5/006; G09G 5/363; G09G 2340/12; G09G 2320/0271; G09G 2370/04; G09G 2340/0428; G09G 2340/125; G09G 2370/042; G09G 2320/066; G09G 2360/02; G09G 2370/12; G09G 2340/10; G09G 5/026; H04N 5/44504; H04N 5/57
USPC .......................................................... 701/70
See application file for complete search history.

(56) References Cited

U.S. PATENT DOCUMENTS

| | | | |
|---|---|---|---|
| 2004/0163860 A1* | 8/2004 | Matsuzaki | B60K 6/44 180/65.225 |
| 2011/0035126 A1* | 2/2011 | Ishikawa | B60W 10/11 701/65 |
| 2012/0191282 A1 | 7/2012 | Maki | |
| 2013/0304341 A1* | 11/2013 | Sakaguchi | B60W 30/1846 701/69 |
| 2014/0058603 A1* | 2/2014 | Ito | B60W 10/08 701/22 |
| 2014/0058643 A1* | 2/2014 | Kodama | B60K 23/08 701/82 |
| 2016/0152238 A1* | 6/2016 | Mita | B60K 23/0808 180/197 |
| 2016/0221446 A1* | 8/2016 | Suzuki | B60L 3/106 |

(Continued)

FOREIGN PATENT DOCUMENTS

| | | |
|---|---|---|
| JP | 2008-120119 A | 5/2008 |
| JP | 2011-63038 A | 3/2011 |

*Primary Examiner* — Jonathan M Dager
*Assistant Examiner* — Jean W Charleston
(74) *Attorney, Agent, or Firm* — Oblon, McClelland, Maier & Neustadt, L.L.P.

(57) ABSTRACT

A driving force control apparatus for controlling a driving force to be transmitted to a wheel includes a processor. The processor is configured to set, when the wheel is idled, a control amount of the driving force to be transmitted to the wheel based on a vehicle acceleration.

6 Claims, 4 Drawing Sheets

(56) References Cited

U.S. PATENT DOCUMENTS

2017/0183008 A1* 6/2017 Isono .................. B60L 15/2036
2018/0237014 A1* 8/2018 Nasu ...................... B60K 17/02

* cited by examiner

DRIVING FORCE CONTROL APPARATUS, DRIVING APPARATUS, AND DRIVING FORCE TRANSMISSION APPARATUS

INCORPORATION BY REFERENCE

The disclosure of Japanese Patent Application No. 2018-209816 filed on Nov. 7, 2018 including the specification, drawings and abstract is incorporated herein by reference in its entirety.

BACKGROUND

1. Technical Field

The present disclosure relates to a driving force control apparatus configured to control a driving force to be transmitted to wheels, a driving apparatus configured to drive a vehicle, and a driving force transmission apparatus configured to transmit a driving force of a drive source of a vehicle to wheels.

2. Description of Related Art

Four-wheel drive vehicles capable of adjusting a driving force to be transmitted to a pair of right and left front wheels and a pair of right and left rear wheels may drive the front wheels by using an engine that is an internal combustion engine, and drive the rear wheels by using an electric motor (see, for example, Japanese Unexamined Patent Application Publication No. 2008-120119 (JP 2008-120119 A) and Japanese Unexamined Patent Application Publication No. 2011-63038 (JP 2011-63038 A)). For example, if the rear wheel is slipped due to idling, such four-wheel drive vehicles can keep traveling owing to the driving force of the front wheels. Thus, those four-wheel drive vehicles are excellent in road ability.

If the rear wheel is slipped, the four-wheel drive vehicle described in JP 2008-120119 A calculates a motor output torque that can resolve the slipping state depending on how the slipping occurs, and generates a torque command value for the electric motor based on the motor output torque. Even if the slipping state is resolved, the four-wheel drive vehicle keeps the torque command value that can resolve the slipping and is necessary for the four-wheel drive until a predetermined time elapses.

If the rear wheel is slipped, the four-wheel drive vehicle described in JP 2011-63038 A gradually reduces a motor driving force of the electric motor that drives the rear wheels, and estimates a road friction coefficient based on a motor driving force when the grip of the rear wheel is regained. Then, the four-wheel drive vehicle controls driving forces of the front wheels and the rear wheels based on the estimated road friction coefficient.

SUMMARY

JP 2008-120119 A does not explicitly describe how the motor output torque that can resolve the slipping state is calculated. Depending on the calculation method, a torque extremely smaller than the torque necessary to resolve the slipping may be set as the motor output torque, thereby increasing the time required to regain a driving force for causing the vehicle to travel forward.

In JP 2011-63038 A, the motor driving force is gradually reduced in order to determine the road friction coefficient. Therefore, the time required to resolve the slipping of the rear wheel may increase, thereby increasing the time required to regain the driving force for causing the vehicle to travel forward.

The present disclosure provides a driving force control apparatus, a driving apparatus, and a driving force transmission apparatus that can promptly resolve a slipping state and regain a driving force for causing a vehicle to travel forward when a wheel is slipped due to idling.

A driving force control apparatus according to a first aspect of the present disclosure includes a processor. The processor controls a driving force to be transmitted to a wheel. The driving force control apparatus is configured to set, when the wheel is idled, a control amount of the driving force to be transmitted to the wheel based on a vehicle acceleration.

In the driving force control apparatus according to the first aspect of the present disclosure, the processor may be configured to set, when a slipping rate in an event of idling of the wheel is larger than a target value of the slipping rate of the wheel, the control amount of the driving force to be transmitted to the wheel based on the vehicle acceleration.

In the driving force control apparatus according to the first aspect of the present disclosure, the processor may be configured to set the control amount of the driving force based on a feedforward control amount calculated through feedforward control. The processor may be configured to set, when the wheel is idled, as the feedforward control amount, a smaller one of a vehicle acceleration-associated feedforward control amount that is calculated based on the vehicle acceleration and a command value of the driving force that is calculated based on a vehicle traveling condition.

In the driving force control apparatus according to the first aspect of the present disclosure, the processor may be configured to perform feedback control for the feedforward control amount based on the target value of the slipping rate of the wheel.

In the driving force control apparatus according to the first aspect of the present disclosure, the wheel may be a rear wheel of a vehicle that is a four-wheel vehicle. The vehicle acceleration may include an acceleration in a longitudinal direction of the vehicle. The processor may be configured to set the vehicle acceleration-associated feedforward control amount to increase as the acceleration in the longitudinal direction of the vehicle increases.

In the driving force control apparatus according to the first aspect of the present disclosure, the vehicle acceleration may include an acceleration in a lateral direction of the vehicle. The processor may be configured to set the vehicle acceleration-associated feedforward control amount to increase as the acceleration in the lateral direction of the vehicle decreases.

In the driving force control apparatus according to the first aspect of the present disclosure, the wheel may be a rear wheel of a vehicle that is a four-wheel vehicle. The vehicle acceleration may include an acceleration in a longitudinal direction of the vehicle, and an acceleration in a lateral direction of the vehicle. The processor may be configured to calculate the vehicle acceleration-associated feedforward control amount by subtracting, from a first feedforward control amount associated with the acceleration in the longitudinal direction of the vehicle, a second feedforward control amount associated with the acceleration in the lateral direction of the vehicle.

In the driving force control apparatus according to the first aspect of the present disclosure, the processor may be configured to set the vehicle acceleration-associated feedforward control amount based also on an estimated value of a road friction coefficient.

A driving apparatus according to a second aspect of the present disclosure includes an electric motor, a driving force transmission mechanism, and a processor. The electric motor serves as a drive source of a vehicle. The driving force transmission mechanism is configured to transmit a driving force of the electric motor to a wheel. The processor is configured to control the electric motor. The processor is configured to set, when the wheel is idled, a control amount of the driving force to be transmitted to the wheel based on a vehicle acceleration.

In the driving apparatus according to the second aspect of the present disclosure, the processor may be configured to set, when a slipping rate in an event of idling of the wheel is larger than a target value of the slipping rate of the wheel, the control amount of the driving force to be transmitted to the wheel based on the vehicle acceleration.

A driving force transmission apparatus according to a third aspect of the present disclosure includes a clutch and a processor. The driving force transmission apparatus transmits a driving force of a drive source of a vehicle to a wheel. The clutch is configured to adjust the driving force to be transmitted to the wheel. The processor is configured to control the clutch. The processor is configured to set, when the wheel is idled, a control amount of the driving force to be transmitted to the wheel based on a vehicle acceleration.

In the driving force transmission apparatus according to the third aspect of the present disclosure, the processor may be configured to set, when a slipping rate in an event of idling of the wheel is larger than a target value of the slipping rate of the wheel, the control amount of the driving force to be transmitted to the wheel based on the vehicle acceleration.

According to the first to third aspects of the present disclosure, the slipping state can be resolved and the driving force for causing the vehicle to travel forward can be regained promptly when the wheel is slipped due to idling.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

[First Embodiment]

A first embodiment of the present disclosure is described with reference to FIG. 1 to FIG. 4. The following embodiments are provided as preferred specific examples for carrying out the present disclosure, and specifically demonstrate various preferred technical matters in part, but the technical scope of the present disclosure is not limited to the specific examples.

Figure 1:
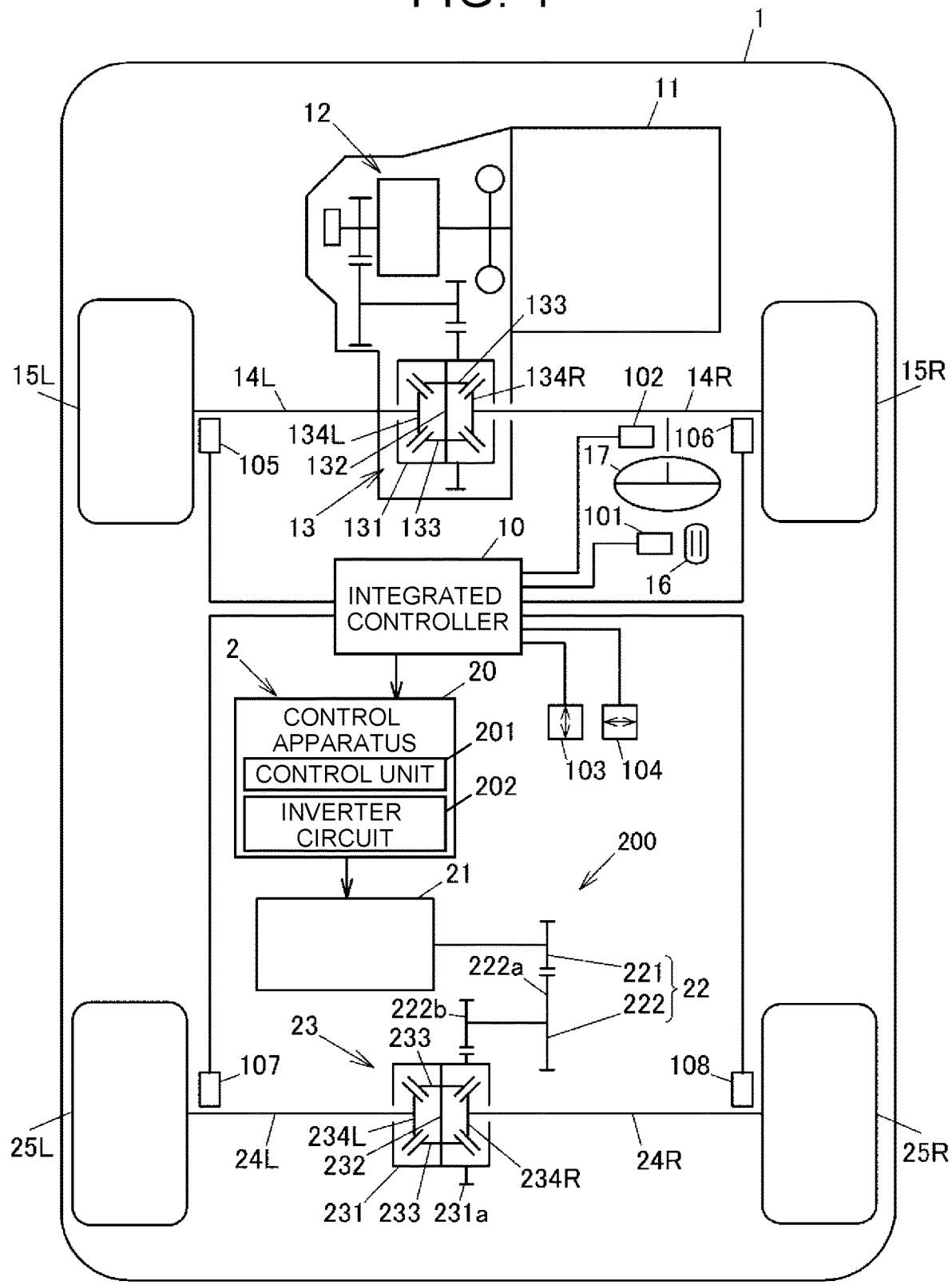
FIG. 1 is a schematic diagram illustrating an example of the configuration of a four-wheel drive vehicle on which a control apparatus and a driving apparatus according to a first embodiment of the present disclosure are mounted.

FIG. 1 is a schematic diagram illustrating an example of the configuration of a four-wheel drive vehicle on which a control apparatus and a driving apparatus according to the first embodiment of the present disclosure are mounted. In a four-wheel drive vehicle 1, right and left front wheels 15R and 15L are driven by a power unit 11 serving as a main drive source, and right and left rear wheels 25R and 25L are driven by a driving apparatus 2 including an electric motor 21 serving as a subordinate drive source. An engine that is an internal combustion engine may be used as the power unit 11, or an electric motor may be used as the power unit 11. A hybrid system that is a combination of the engine and the electric motor may be used.

A driving force of the power unit 11 is varied by a transmission 12, and is distributed to right and left drive shafts 14R and 14L via a front differential 13 while allowing differential motion. The front differential 13 includes a differential case 131, a pinion shaft 132, a pair of pinion gears 133 and 133, and a pair of side gears 134R and 134L. Both ends of the pinion shaft 132 are supported on the differential case 131. The pinion gears 133 and 133 are rotatably supported by the pinion shaft 132. The side gears 134R and 134L mesh with the pinion gears 133 and 133 with their gear axes set orthogonal to each other. The right and left drive shafts 14R and 14L are coupled to the side gears 134R and 134L so as not to be rotatable respectively relative to the side gears 134R and 134L, and transmit the driving force to the right and left front wheels 15R and 15L.

The driving apparatus 2 includes the electric motor 21, a control apparatus 20, and a driving force transmission mechanism 200. The control apparatus 20 serves as a driving force control apparatus configured to supply motor currents to the electric motor 21. The driving force transmission mechanism 200 transmits a driving force of the electric motor 21 to the right and left rear wheels 25R and 25L. In this embodiment, the driving force transmission mechanism 200 includes a speed reducing mechanism 22, a rear differential 23, and right and left drive shafts 24R and 24L. The driving force of the electric motor 21 is varied by the speed reducing mechanism 22 through speed reduction, and is distributed to the right and left drive shafts 24R and 24L via the rear differential 23 while allowing differential motion.

For example, the control apparatus 20 includes an inverter circuit 202 and a control unit 201. The inverter circuit 202 includes a three-phase bridge circuit constituted by a plurality of switching elements. The control unit 201 generates pulse width modulation (PWM) signals for turning ON or OFF the switching elements of the inverter circuit 202. The control apparatus 20 adjusts the motor currents to be supplied to the electric motor 21 by increasing or reducing duty ratios of the PWM signals, thereby controlling the driving force to be transmitted to the right and left rear wheels 25R and 25L. For example, the electric motor 21 is a three-phase brushless motor.

The rear differential 23 includes a differential case 231, a pinion shaft 232, a pair of pinion gears 233 and 233, and a pair of side gears 234R and 234L. Both ends of the pinion shaft 232 are supported on the differential case 231. The pinion gears 233 and 233 are rotatably supported by the pinion shaft 232. The side gears 234R and 234L mesh with the pinion gears 233 and 233 with their gear axes set orthogonal to each other. The right and left drive shafts 24R and 24L are coupled to the side gears 234R and 234L so as not to be rotatable respectively relative to the side gears 234R and 234L, and transmit the driving force to the right and left rear wheels 25R and 25L.

The speed reducing mechanism 22 includes a pinion gear 221 and a speed reducing gear 222. The pinion gear 221 is fixed to a shaft of the electric motor 21. A large-diameter gear portion 222a and a small-diameter gear portion 222b of the speed reducing gear 222 are coupled together so as not to be rotatable relative to each other. The large-diameter gear portion 222a meshes with the pinion gear 221. The small-diameter gear portion 222b meshes with a ring gear 231a fixed to the differential case 231.

An integrated controller 10 is mounted on the four-wheel drive vehicle 1 to integrally control the entire vehicle. The integrated controller 10 can acquire detection signals indicating detection results from an accelerator operation amount sensor 101, a steering angle sensor 102, a longitudinal acceleration sensor 103, a lateral acceleration sensor 104, and rotation speed sensors 105 to 108. The accelerator operation amount sensor 101 detects a depression amount of an accelerator pedal 16. The steering angle sensor 102 detects a steering angle of a steering wheel 17 to be used for steering the right and left front wheels 15R and 15L. The longitudinal acceleration sensor 103 detects an acceleration in a longitudinal direction of the vehicle (longitudinal G). The lateral acceleration sensor 104 detects an acceleration in a lateral direction of the vehicle (lateral G). The rotation speed sensors 105 to 108 detect rotation speeds of the right and left front wheels 15R and 15L and the right and left rear wheels 25R and 25L. The integrated controller 10 corresponds to a higher-level controller compared with the control apparatus 20.

The integrated controller 10 calculates a torque command value that is a command value of the driving force (torque) to be transmitted to the right and left rear wheels 25R and 25L based on a vehicle traveling condition of the four-wheel drive vehicle 1. Examples of the vehicle traveling condition include the depression amount of the accelerator pedal 16 that is detected by the accelerator operation amount sensor 101, and the steering angle of the steering wheel 17 that is detected by the steering angle sensor 102. For example, the torque command value calculated by the integrated controller 10 is sent to the control apparatus 20 via an on-board network such as a controller area network (CAN). The control apparatus 20 can acquire the detection signals indicating the detection results from the sensors 101 to 108 via the on-board network.

For example, the torque command value has a larger value as the depression amount of the accelerator pedal 16 increases and as the steering angle of the steering wheel 17 increases. The torque command value is not limited to the torque command value sent from the integrated controller 10. The control unit 201 of the control apparatus 20 may calculate the torque command value based on the vehicle traveling condition, and perform control described later by using the torque command value. In a normal state in which the right rear wheel 25R or the left rear wheel 25L is not slipped due to idling, the control apparatus 20 controls the electric motor 21 so that a driving force that is based on the torque command value is transmitted to the right and left rear wheels 25R and 25L.

When one or both of the right and left rear wheels 25R and 25L is idled, the control apparatus 20 reduces the driving force to be transmitted to the right and left rear wheels 25R and 25L so as to resolve the idling state. The right rear wheel 25R and the left rear wheel 25L receive the driving force of the electric motor 21 from the rear differential 23 that does not have a differential motion limiting mechanism configured to limit differential motion of the side gears 234R and 234L. Therefore, when one of the right rear wheel 25R and the left rear wheel 25L is idled, the driving force is not transmitted to the other wheel.

In this embodiment, the control unit 201 of the control apparatus 20 sets a control amount of the driving force to be transmitted to the right and left rear wheels 25R and 25L based on a vehicle acceleration. The vehicle acceleration includes the longitudinal G detected by the longitudinal acceleration sensor 103, and the lateral G detected by the lateral acceleration sensor 104.

Figure 2:
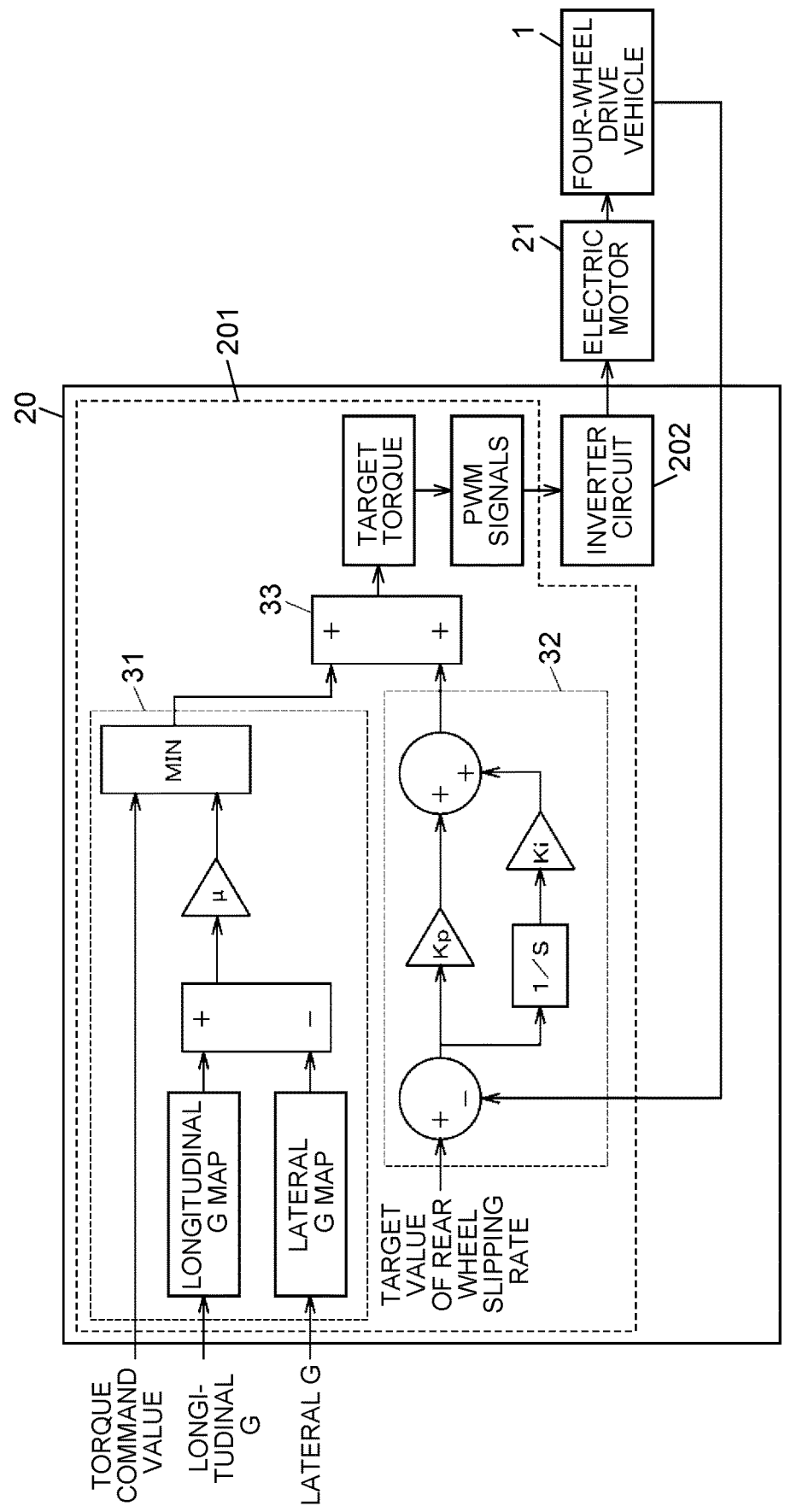
FIG. 2 is a block diagram illustrating control processing to be performed by a control unit of the control apparatus.

Next, a specific example of control to be performed by the control unit 201 is described in detail with reference to FIG. 2. FIG. 2 is a block diagram illustrating control processing to be performed by the control unit 201 of the control apparatus 20 when at least one of the right and left rear wheels 25R and 25L is idled. The control unit 201 is a processor including a central processing unit (CPU) and a non-volatile memory that stores a program. The following control processing is performed by executing the program on the CPU. In FIG. 2, a feedforward (FF) control unit 31 configured to perform FF control and a feedback (FB) control unit 32 configured to perform FB control are surrounded by dashed lines.

The control unit 201 calculates a first FF control amount by applying the longitudinal G detected by the longitudinal acceleration sensor 103 to a longitudinal G map, and calculates a second FF control amount by applying the lateral G detected by the lateral acceleration sensor 104 to a lateral G map. Both the first FF control amount and the second FF control amount are 0 or positive values larger than 0.

The control unit 201 calculates a difference FF control amount by subtracting the second FF control amount from the first FF control amount, and calculates a vehicle acceleration-associated FF control amount based on the difference FF control amount and an estimated value of a road friction coefficient μ. Specifically, a product of the difference FF control amount and the estimated value of the road friction coefficient μ is calculated as the vehicle acceleration-associated FF control amount. Further, the control unit 201 compares the vehicle acceleration-associated FF control amount and the torque command value calculated based on the vehicle traveling condition, and sets a smaller one of the vehicle acceleration-associated FF control amount and the torque command value as an FF control amount. Thus, the vehicle acceleration-associated FF control amount serves as an upper limit value of the FF control amount. That is, the FF control amount is limited to a value equal to or smaller than the vehicle acceleration-associated FF control amount. The vehicle acceleration-associated FF control amount is set to increase as the longitudinal G increases and as the lateral G decreases.

Figure 3:
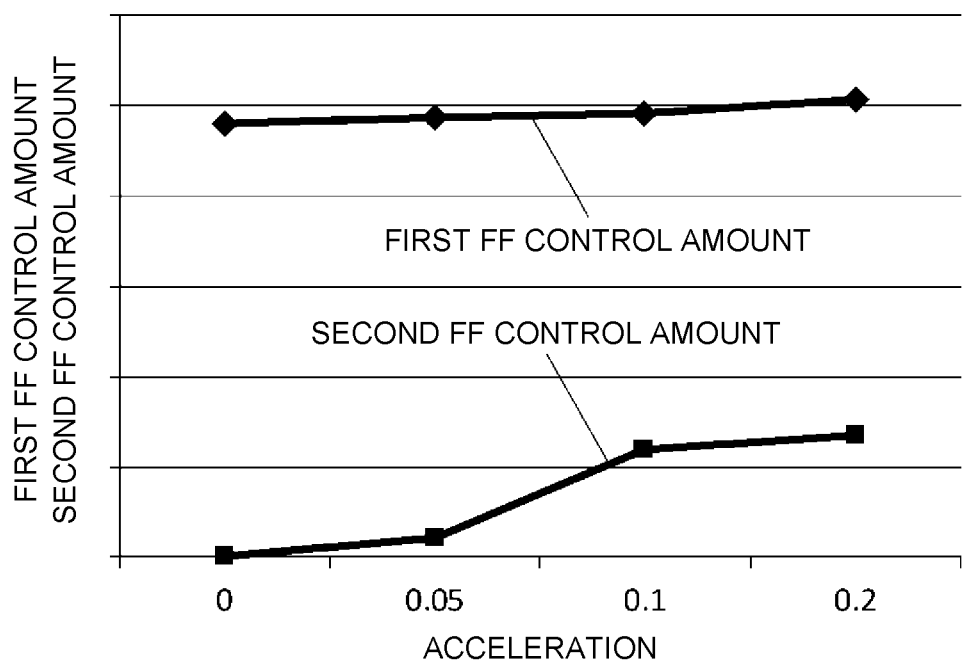
FIG. 3 is a graph illustrating a relationship between a vehicle acceleration and each of a first feedforward (FF) control amount and a second FF control amount.

FIG. 3 is a graph illustrating a relationship between the detected vehicle acceleration (longitudinal G and lateral G) and each of the first FF control amount and the second FF control amount. The non-volatile memory of the control unit 201 stores a relationship between the longitudinal G and the first FF control amount as the longitudinal G map, and a relationship between the lateral G and the second FF control amount as the lateral G map. At the same magnitude of the acceleration on a horizontal axis, the first FF control amount is larger than the second FF control amount.

In this embodiment, the longitudinal G map defines a relationship in which the first FF control amount increases as the longitudinal G increases. This relationship is defined in consideration of the following fact. During acceleration, traveling along a climbing road, or the like, the longitudinal G increases, and loads on the right and left rear wheels 25R and 25L increase. In this case, tire tread loads of the right and left rear wheels 25R and 25L increase. Therefore, slipping is unlikely to occur due to idling even if a great driving force is transmitted to the right and left rear wheels 25R and 25L. In other words, even if idling occurs, the idling is likely to end early.

In this embodiment, the lateral G map defines a relationship in which the second FF control amount increases as the lateral G increases. This relationship is defined in consideration of the following fact. During turning or the like, the lateral G increases, and a cornering force (lateral force) increases on a tire friction circle. Therefore, a friction force that can be allocated to a forward propulsive force decreases. Thus, when the lateral G increases, the value of the second FF control amount subtracted from the first FF control amount increases, and the vehicle acceleration-associated FF control amount decreases.

For example, the control unit 201 can acquire the estimated value of the road friction coefficient μ from the integrated controller 10. For example, the road friction coefficient μ can be estimated by analyzing a road image captured by an on-board camera. If the road friction coefficient μ cannot be acquired, the value obtained by subtracting the second FF control amount from the first FF control amount need not be multiplied by the estimated value of the road friction coefficient μ. In this case, the difference between the first FF control amount and the second FF control amount is the vehicle acceleration-associated FF control amount. In other words, the estimated value of the road friction coefficient μ is regarded as 1 in the calculation.

A smaller one of the vehicle acceleration-associated FF control amount and the torque command value is set as the FF control amount in order to limit, when the right and left rear wheels 25R and 25L are idled, the driving force to be transmitted to the right and left rear wheels 25R and 25L based also on the vehicle acceleration only if the vehicle acceleration-associated FF control amount is smaller than the torque command value. In other words, the FF control amount is prevented from being larger than the torque command value. If the vehicle acceleration-associated FF control amount is equal to or larger than the torque command value calculated based on the vehicle traveling condition, the torque command value directly serves as the FF control amount.

In this embodiment, feedback control is performed for the FF control amount based on a target value of a rear wheel slipping rate. The rear wheel slipping rate can be determined from an arithmetic expression of $(V_2-V_1)/V_1$, where $V_1$ represents a vehicle speed and $V_2$ represents a vehicle speed conversion value obtained by converting the rotation speeds of the right and left rear wheels 25R and 25L into a vehicle speed. The vehicle speed $V_1$ may be acquired from the integrated controller 10, or may be calculated based on the steering angle and the rotation speed of a wheel whose rotation speed is lowest (not slipped) among the right and left front wheels 15R and 15L and the right and left rear wheels 25R and 25L.

Figure 4:
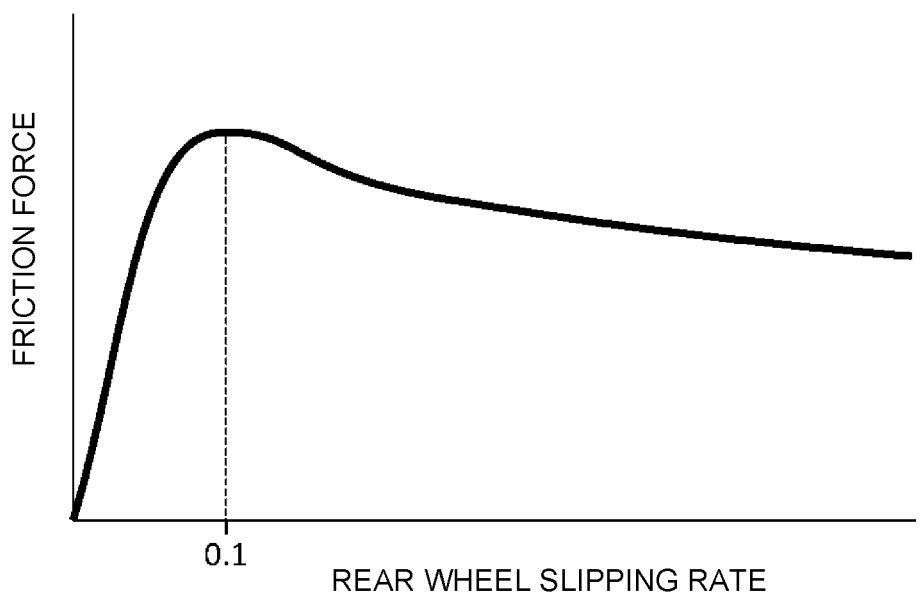
FIG. 4 is a graph illustrating an example of a relationship between a rear wheel slipping rate and a friction force between a tire and a road.

FIG. 4 is a graph illustrating an example of a relationship between the rear wheel slipping rate and a friction force between a tire and a road. The friction force between the tire and the road takes a maximum value when the rear wheel slipping rate is a predetermined value (0.1 in the example illustrated in FIG. 4), and gradually decreases when the rear wheel slipping rate exceeds the predetermined value. The target value of the rear wheel slipping rate for use in the feedback control is a value corresponding to the predetermined value, and is determined based on, for example, experiments so that the driving force of the electric motor 21 can efficiently be transmitted to the road from the right and left rear wheels 25R and 25L to serve as a propulsive force of the four-wheel drive vehicle 1.

When the rear wheel slipping rate in the event of idling of the right and left rear wheels 25R and 25L is larger than the target value, the control unit 201 sets the control amount of the driving force to be transmitted to the right and left rear wheels 25R and 25L based on the vehicle acceleration (longitudinal G and lateral G). In other words, when the rear wheel slipping rate is equal to or smaller than the target value, the feedback control is not performed.

When the right and left rear wheels 25R and 25L are idled and the rear wheel slipping rate is larger than the target value, the control unit 201 performs feedback control so that an actual rear wheel slipping rate of the four-wheel drive vehicle 1 is closer to the target value. In the event of slipping due to the idling, the rear wheel slipping rate is generally a value considerably larger than the target value. Through the feedback control performed by the control unit 201, the rear wheel slipping rate is gradually closer to the target value from the value larger than the target value (right side on a horizontal axis of the graph of FIG. 4). Accordingly, the friction force increases.

The control unit 201 performs the processing in the FB control unit 32 through proportional-integral control (PI control). In FIG. 2, Kp represents a proportional gain, Ki represents an integral gain, and 1/S represents an integral term. An FB control amount is calculated by adding a calculation result of the proportional element and a calculation result of the integral element. The FB control amount is added to the FF control amount by an addition unit 33. A target torque that is a torque to be generated by the electric motor 21 is calculated based on the added value.

The control unit 201 generates, based on the target torque, PWM signals for turning ON or OFF the switching elements of the inverter circuit 202, and outputs the generated PWM signals to the inverter circuit 202. The inverter circuit 202 outputs motor currents subjected to the PWM control to the electric motor 21. The electric motor 21 generates a driving force for driving the right and left rear wheels 25R and 25L.

The control unit 201 continues the control processing until the slipping state in which the right and left rear wheels 25R and 25L are idled is resolved. Whether the slipping state is resolved can be determined based on, for example, whether a difference between an average rotation speed of the right and left front wheels 15R and 15L and an average rotation speed of the right and left rear wheels 25R and 25L is equal to or smaller than a predetermined value. After the slipping state of the right and left rear wheels 25R and 25L is resolved, the control unit 201 controls the electric motor 21 so that the electric motor 21 generates a driving force that is based on the torque command value calculated based on the vehicle traveling condition.

(Actions and Effects of First Embodiment)

According to the first embodiment described above, when the right or left rear wheel 25R or 25L is slipped due to idling, the control amount (FF control amount) of the driving force to be transmitted to the right and left rear wheels 25R and 25L is set based on the vehicle acceleration. Therefore, the slipping state can be resolved and a driving force for causing the vehicle to travel forward can be regained more promptly than, for example, a case where the upper limit value of the driving force to be transmitted to the right and left rear wheels 25R and 25L is set as a fixed value.

That is, if the upper limit value of the driving force to be transmitted to the right and left rear wheels 25R and 25L is set as a fixed value, the fixed value needs to be set to a value small enough to resolve the idling of the right and left rear wheels 25R and 25L irrespective of the traveling condition and the slipping state. According to this embodiment, based on the vehicle acceleration, the vehicle acceleration-associated FF control amount serving as the upper limit value of the FF control amount is set to increase as the longitudinal G increases and as the lateral G decreases. Thus, it is possible to transmit as great a driving force as possible to the right and left rear wheels 25R and 25L depending on the turning condition and the loads of the right and left rear wheels 25R and 25L while suppressing the slipping of the right and left rear wheels 25R and 25L. Accordingly, the road ability of the four-wheel drive vehicle 1 can be increased.

According to the first embodiment, the vehicle acceleration-associated FF control amount is set based also on the estimated value of the road friction coefficient Therefore, the vehicle acceleration-associated FF control amount can be set more appropriately. Through the control of the FB control unit 32, the feedback control is performed for the FF control amount based on the target value of the rear wheel slipping rate. Therefore, the friction forces of the treads of the right and left rear wheels 25R and 25L, which serve as the propulsive force of the four-wheel drive vehicle 1, can be increased in response to a small change in the road condition along with traveling.

[Second Embodiment]

Figure 5:
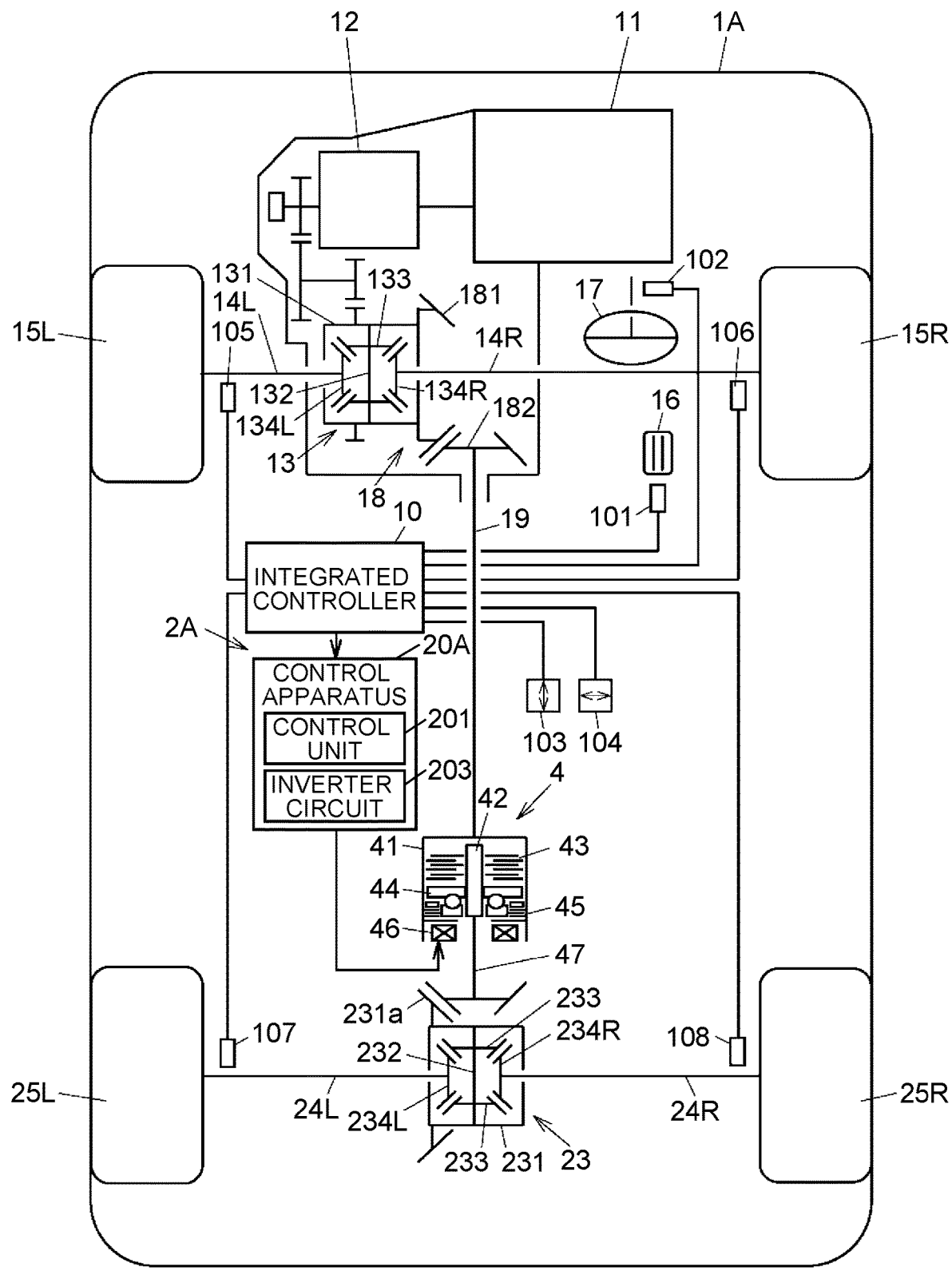
FIG. 5 is a schematic diagram illustrating the configuration of a four-wheel drive vehicle according to a second embodiment of the present disclosure.

Next, a second embodiment of the present disclosure is described with reference to FIG. 5. FIG. 5 is a schematic diagram illustrating the configuration of a four-wheel drive vehicle 1A according to the second embodiment of the present disclosure. In FIG. 5, components corresponding to the components of the four-wheel drive vehicle 1 according to the first embodiment, which are described with reference to FIG. 1 and the like, are represented by the same reference symbols as those used in the first embodiment to omit redundant description.

In the first embodiment, description is given of the case where the right and left rear wheels 25R and 25L of the four-wheel drive vehicle 1 are driven by the electric motor 21. In the four-wheel drive vehicle 1A according to this embodiment, the right and left rear wheels 25R and 25L are driven by the driving force of the power unit 11 that is transmitted via a transfer gear 18 and a propeller shaft 19. The transfer gear 18 includes a ring gear 181 and a pinion gear 182. The ring gear 181 is fixed to the differential case 131 of the front differential 13. The pinion gear 182 is fixed to one end of the propeller shaft 19.

A torque coupling 4 is arranged between the propeller shaft 19 and the rear differential 23. The torque coupling 4 includes a clutch 43 capable of adjusting the driving force to be transmitted to the right and left rear wheels 25R and 25L. The torque coupling 4 includes a bottomed cylindrical clutch drum 41, an inner shaft 42, the clutch 43, a cam mechanism 44, a pilot clutch 45, an electromagnetic coil 46, and a pinion gear shaft 47. The clutch drum 41 rotates together with the propeller shaft 19. The inner shaft 42 is coaxially arranged inside the clutch drum 41. The clutch 43 is arranged between the clutch drum 41 and the inner shaft 42. The pilot clutch 45 and the electromagnetic coil 46 actuate the cam mechanism 44. The pinion gear shaft 47 is coupled to the inner shaft 42 so as not to be rotatable relative to the inner shaft 42.

The pinion gear shaft 47 meshes with the ring gear 231a fixed to the differential case 231. The clutch 43 is a multi-disc clutch including a plurality of outer clutch plates that are not rotatable but axially movable relative to the clutch drum 41, and a plurality of inner clutch plates that are not rotatable but axially movable relative to the inner shaft 42.

The cam mechanism 44 converts a rotational force of the clutch drum 41 that is transmitted via the pilot clutch 45 into an axial thrust force. For example, the cam mechanism 44 is a ball cam mechanism. The pilot clutch 45 transmits, to the cam mechanism 44, a rotational force that is based on a magnetic force generated by the electromagnetic coil 46. The cam mechanism 44 presses the clutch 43 in the axial direction by a pressing force that is based on the rotational force transmitted from the pilot clutch 45. Thus, the outer clutch plates and the inner clutch plates of the clutch 43 are brought into frictional contact with each other, and the driving force is transmitted from the clutch drum 41 to the inner shaft 42.

The electromagnetic coil 46 is supplied with an exciting current from a control apparatus 20A. The control apparatus 20A includes the control unit 201 and a switching circuit 203. The control unit 201 executes control processing similar to that of the first embodiment. The switching circuit 203 includes a switching element and a smoothing circuit. The control unit 201 generates a PWM signal for turning ON or OFF the switching element of the switching circuit 203. The switching circuit 203 supplies the electromagnetic coil 46 with an exciting current whose magnitude is based on a duty ratio of the PWM signal. Thus, the clutch 43 is pressed by a pressing force that is based on the magnitude of the exciting current, and the driving force is transmitted from the propeller shaft 19 to the rear differential 23 via the clutch drum 41 and the inner shaft 42. In this manner, the control apparatus 20A controls the clutch 43 by the exciting current to be supplied to the electromagnetic coil 46.

The control apparatus 20A and the torque coupling 4 constitute a driving force transmission apparatus 2A configured to transmit the driving force of the power unit 11 toward the right and left rear wheels 25R and 25L. Similarly to the control apparatus 20 according to the first embodiment, when the right and left rear wheels 25R and 25L are idled, the control apparatus 20A sets the control amount of the driving force to be transmitted to the right and left rear wheels 25R and 25L based on the vehicle acceleration (longitudinal G and lateral G). According to the second embodiment, actions and effects similar to those of the first embodiment can be attained.

(Supplementary Note)

Although the present disclosure has been described above based on the first and second embodiments, the applicable embodiment of the claims is not limited to the embodiments. It should be noted that all combinations of the features described in the embodiments are not essential for the solution of the present disclosure to the problem.

The present disclosure may be modified as appropriate without departing from the spirit of the present disclosure. For example, in the first and second embodiments, description is given of the case where the control apparatus 20 or 20A controls the driving force to be transmitted to the right and left rear wheels 25R and 25L. The present disclosure may be applied to a control apparatus (driving force control apparatus) configured to control the driving force to be transmitted to the right and left front wheels 15R and 15L. In this case, tread loads of the right and left front wheels 15R and 15L decrease as the longitudinal G increases. Therefore, the gradient of the first FF control amount defined in the longitudinal G map is reverse to that illustrated in FIG. 3. Thus, the first FF control amount decreases as the longitudinal G increases.

The present disclosure is also applicable to control apparatuses for in-wheel motors provided in association with the wheels of the four-wheel vehicle. In this case, the control apparatus for in-wheel motors on the front wheel side reduces the first FF control amount as the longitudinal G increases, and the control apparatus for in-wheel motors on the rear wheel side increases the first FF control amount as the longitudinal G increases.

What is claimed is:

1. A driving force control apparatus for controlling a driving force to be transmitted to a wheel, the driving force control apparatus comprising:
    a processor configured to set, when a slipping rate of the wheel is larger than a target value of the slipping rate of the wheel while the wheel is idled, a control amount of the driving force to be transmitted to the wheel based on a vehicle acceleration, wherein:
    the processor is configured to set the control amount of the driving force based on a feedforward control amount calculated through feedforward control,
    the processor is configured to set, when the wheel is idled, as the feedforward control amount, a smaller one of a vehicle acceleration-associated feedforward control amount that is calculated based on the vehicle acceleration and a command value of the driving force that is calculated based on a vehicle traveling condition,
    the processor is configured to calculate the vehicle acceleration-associated feedforward control amount as a product of a difference between a first feedforward control amount based on a longitudinal acceleration in a longitudinal direction of the vehicle and a second feedforward control amount based on a lateral acceleration in a lateral direction of the vehicle, and an estimated value of a road friction coefficient, and
    the processor is configured to perform feedback control for the feedforward control amount based on the target value of the slipping rate of the wheel.

2. The driving force control apparatus according to claim 1, wherein:
    the wheel is a rear wheel of a vehicle that is a four-wheel vehicle; and
    the processor is configured to increase the first feedforward control amount as the longitudinal acceleration in the longitudinal direction of the vehicle increases.

3. The driving force control apparatus according to claim 1, wherein:
    the processor is configured to increase the second feedforward control amount as the lateral acceleration in the lateral direction of the vehicle increases.

4. The driving force control apparatus according to claim 1, wherein:
    the wheel is a rear wheel of a vehicle that is a four-wheel vehicle.

5. A driving apparatus, comprising:
    an electric motor serving as a drive source of a vehicle;
    a driving force transmission mechanism configured to transmit a driving force of the electric motor to a wheel; and
    a processor configured to control the electric motor, the processor configured to set, when a slipping rate of the wheel is larger than a target value of the slipping rate of the wheel while the wheel is idled, a control amount of the driving force to be transmitted to the wheel based on a vehicle acceleration, wherein:
    the processor is configured to set the control amount of the driving force based on a feedforward control amount calculated through feedforward control,
    the processor is configured to set, when the wheel is idled, as the feedforward control amount, a smaller one of a vehicle acceleration-associated feedforward control amount that is calculated based on the vehicle acceleration and a command value of the driving force that is calculated based on a vehicle traveling condition,
    the processor is configured to calculate the vehicle acceleration-associated feedforward control amount as a product of a difference between a first feedforward control amount based on a longitudinal acceleration in a longitudinal direction of the vehicle and a second feedforward control amount based on a lateral acceleration in a lateral direction of the vehicle, and an estimated value of a road friction coefficient, and
    the processor is configured to perform feedback control for the feedforward control amount based on the target value of the slipping rate of the wheel.

6. A driving force transmission apparatus for transmitting a driving force of a drive source of a vehicle to a wheel, the driving force transmission apparatus comprising:
    a clutch configured to adjust the driving force to be transmitted to the wheel; and
    a processor configured to control the clutch, the processor configured to set, when a slipping rate of the wheel is larger than a target value of the slipping rate of the wheel while the wheel is idled, a control amount of the driving force to be transmitted to the wheel based on a vehicle acceleration, wherein:
    the processor is configured to set the control amount of the driving force based on a feedforward control amount calculated through feedforward control,
    the processor is configured to set, when the wheel is idled, as the feedforward control amount, a smaller one of a vehicle acceleration-associated feedforward control amount that is calculated based on the vehicle acceleration and a command value of the driving force that is calculated based on a vehicle traveling condition,
    the processor is configured to calculate the vehicle acceleration-associated feedforward control amount as a product of a difference between a first feedforward control amount based on a longitudinal acceleration in a longitudinal direction of the vehicle and a second feedforward control amount based on a lateral acceleration in a lateral direction of the vehicle, and an estimated value of a road friction coefficient, and
    the processor is configured to perform feedback control for the feedforward control amount based on the target value of the slipping rate of the wheel.

* * * * *